United States Patent
Suzuki

(10) Patent No.: US 11,273,865 B2
(45) Date of Patent: Mar. 15, 2022

(54) STEERING CONTROL DEVICE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 62 days.

(21) Appl. No.: 16/922,872

(22) Filed: Jul. 7, 2020

(65) Prior Publication Data

US 2021/0009202 A1    Jan. 14, 2021

(30) Foreign Application Priority Data

Jul. 9, 2019    (JP) .............................. JP2019-127629

(51) Int. Cl.
*B62D 6/00* (2006.01)
*B62D 5/00* (2006.01)

(52) U.S. Cl.
CPC ............. *B62D 6/008* (2013.01); *B62D 5/006* (2013.01); *B62D 6/002* (2013.01)

(58) Field of Classification Search
CPC ...... B62D 6/008; B62D 5/0469; B62D 5/006; B62D 5/0463; B62D 6/002; B62D 5/0409; B62D 5/0421; B62D 5/0481; B62D 5/0496; B60W 50/16

See application file for complete search history.

(56) References Cited

U.S. PATENT DOCUMENTS

| | | | |
|---|---|---|---|
| 2002/0157894 A1* | 10/2002 | Hjelsand | B62D 5/097 180/446 |
| 2006/0200290 A1* | 9/2006 | Chino | B62D 5/0469 701/41 |
| 2008/0164087 A1 | 7/2008 | Koyama et al. | |
| 2012/0330510 A1* | 12/2012 | Kawase | B62D 5/0469 701/41 |
| 2013/0073147 A1* | 3/2013 | Tashiro | B62D 6/008 701/42 |
| 2015/0353124 A1* | 12/2015 | Chai | B62D 5/0463 701/41 |

(Continued)

FOREIGN PATENT DOCUMENTS

| | | |
|---|---|---|
| JP | 2005-096725 A | 4/2005 |
| JP | 2006-062625 A | 3/2006 |

(Continued)

*Primary Examiner* — Ryan Rink
(74) *Attorney, Agent, or Firm* — Maschoff Brennan

(57) ABSTRACT

A steering control device for use in a steer-by-wire system is provided. The steering control device controls a reaction force device and a turning device of a steer-by-wire system. The steering control device includes a steering wheel torque controller that calculates a basic reaction force torque command value being a basic value of a reaction force torque command value so that a detection value of the torque sensor follows a target value. The steering control device further includes an end controller that stops a control of the steering wheel torque controller when: an absolute value of angle of the reaction force device or the turning device is equal to or greater than a limit angle value; and a physical quantity corresponding to an output torque of the turning device and the detection value of the torque sensor are values corresponding to approach to the limit angle value.

7 Claims, 14 Drawing Sheets

(56) References Cited

U.S. PATENT DOCUMENTS

| | | | |
|---|---|---|---|
| 2015/0353126 A1* | 12/2015 | Chai | B62D 5/0463 |
| | | | 701/42 |
| 2020/0130738 A1* | 4/2020 | Kodera | B62D 5/006 |
| 2021/0009198 A1* | 1/2021 | Suzuki | B62D 5/006 |
| 2021/0070351 A1* | 3/2021 | Kataoka | B62D 5/0463 |
| 2021/0229738 A1* | 7/2021 | Kotula | B60W 50/16 |

FOREIGN PATENT DOCUMENTS

| | | |
|---|---|---|
| JP | 3883980 B2 | 11/2006 |
| JP | 6299087 B2 | 3/2018 |

\* cited by examiner

LIMIT ANGLE ABS MAP

LIMIT ANGLE CX MAP

END PRESN CMD VAL MAP FOR POSITIVE GUARD

END PRESN CMD VAL MAP FOR NEGATIVE GUARD

STEERING CONTROL DEVICE

CROSS-REFERENCE TO RELATED APPLICATION

The present application is based on Japanese Patent Application No. 2019-127629 filed on Jul. 9, 2019, disclosure of which is incorporated herein by reference.

TECHNICAL FIELD

The present disclosure relates to a steering control device.

BACKGROUND

There is a technology of a reaction force device of a steer-by-wire system to control a reaction force so that steering beyond a steering angle end is suppressed.

SUMMARY

The present disclosure provides a steering control device for use in a steer-by-wire system.

In an aspect of the present disclosure, the steer-by-wire system includes a reaction force device, a turning device and a torque sensor. The steering control device controls the reaction force device and the turning device. The steering control device includes a steering wheel torque controller that calculates a basic reaction force torque command value being a basic value of a reaction force torque command value so that a detection value of the torque sensor follows a target value that is based on a steering torque command value. The steering control device further includes an end controller that stops a control of the steering wheel torque controller when: an absolute value of angle of the reaction force device or the turning device is equal to or greater than a limit angle value; and a physical quantity corresponding to an output torque of the turning device and the detection value of the torque sensor are values corresponding to a direction toward the limit angle value.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
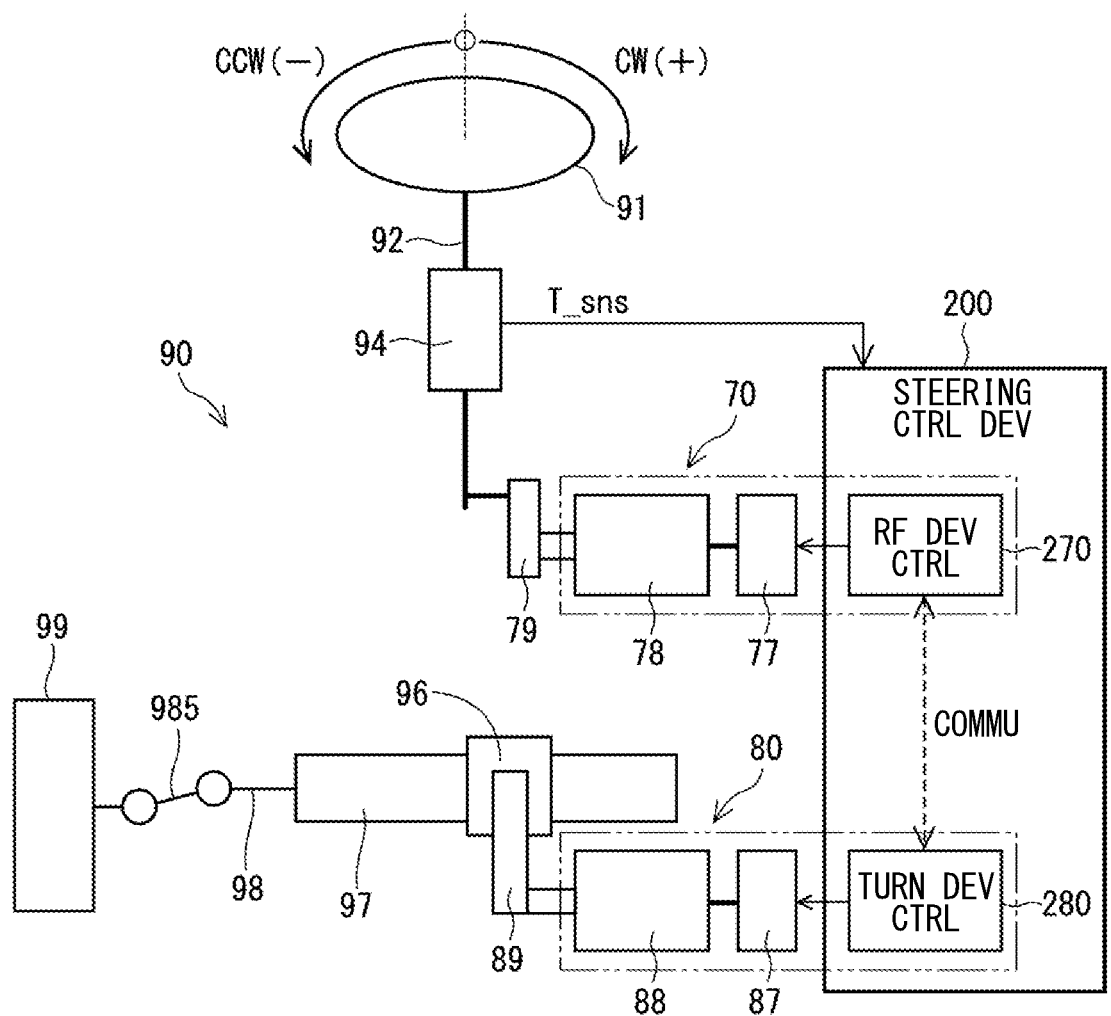
FIG. 1 is a diagram illustrating a general configuration of a steer-by-wire system to which a steering control device of some embodiments are applied.

For example, there is a vehicle steering system that suppresses steering beyond a steering angle end by switching over control of a reaction force device from feedback control to open loop control near the steering angle end. Additionally, there is a vehicle steering system that performs feedback of steering angle near a steering angle end to suppress steering beyond the steering angle end.

A conceivable control configuration of a reaction force device of a steer-by-wire system is such that feedback control is performed so that a detection value of a torque sensor follows a target value. This configuration may have the following difficulty; when the torque of the reaction force device is increased to prevent the driver from operating a steering wheel to a predetermined angle or more, the feedback control operates and a torque for presenting the steering angle end is canceled out.

The present disclosure is made in view of the foregoing in some aspects. For a reaction force device of a steer-by-wire system configured to perform feedback so that a detection value of a torque sensor follows a target value, it is an object of the present disclosure to provide a steering control device that presents a steering angle end to a driver in a natural manner.

In an aspect of the present disclosure, a steering control device controls a reaction force device and a turning device in a steer-by-wire system, the steer-by-wire system including the reaction force device, the turning device and a torque sensor.

The reaction force device includes a reaction-force-use rotary electric machine and a reaction-force-use power converter for driving the reaction-force-use rotary electric machine, and is connected to a steering wheel. The turning device includes a turning-use rotary electric machine and a turning-use power converter for driving the turning-use rotary electric machine, and turns tire wheels. The torque sensor detects a steering input of the driver.

The steering control device includes a reaction force controller, a steering wheel torque controller, an end controller, and a reaction force device current controller. The reaction force controller calculates a steering torque command value on a basis of a physical quantity corresponding to an output torque of the turning device. The steering wheel torque controller calculates a basic reaction force torque command value being a basic value of a reaction force torque command value so that a detection value of the torque sensor follows a target value that is based on the steering torque command value.

When an absolute value of angle of the reaction force device or the turning device is equal to or greater than a predetermined limit angle value, the end controller calculates an end presentation command value of the reaction force device to cause the driver to be unable to rotate the steering wheel to the limit angle value or more. The reaction force device current controller controls an electric current flowing to the reaction-force-use rotary electric machine, on a basis of the basic reaction force torque command value and the end presentation command value. It should be noted that the angle of the turning device or the reaction force device may be a value that is convertible into the angle by multiplying and/or dividing with a conversion factor so that the value can be compared with the limit angle value.

The end controller stops a control of the steering wheel torque controller when: the absolute value of the angle of the reaction force device or the turning device is equal to or greater than the limit angle value; and the physical quantity corresponding to the output torque of the turning device and the detection value of the torque sensor are values corresponding to a direction toward the limit angle value (i.e., a direction approaching the limit angle value). When the physical quantity corresponding to the output torque of the turning device or the detection value of the torque sensor is a value corresponding to a direction away from the limit angle value, the end controller may release the stop of the control.

For example, in some embodiments, the steering wheel torque controller may include an integral calculator at a last stage. In this configuration, the end controller may stop integral calculation of the integral calculator when stopping the control of the steering wheel torque controller.

As described above, switchover to execution and/or stop of the control of the steering wheel torque controller is performed by an end control, in a control configuration in which the feedback control is performed so that the detection value of the torque sensor follows the target value. By stopping the feedback control, it is possible to prevent, when the torque of the reaction force device is increased, the torque for presenting the steering angle end from being canceled out due to the feedback control. Therefore, it is possible to present a natural steering angle end to the driver.

Embodiments of a steering control device will be described with reference to the drawings. The steering control device controls a reaction force device and a turning device in a steer-by-wire system. In the following embodiments, the same or similar reference signs are used to refer to the same or similar parts/configurations to avoid redundant description. In the following, the first and second embodiments are collectively referred to as "specific embodiments".

FIG. 1 illustrates a general configuration of a steer-by-wire system 90 in which a steering mechanism (e.g., including a steering wheel) and a turning mechanism (e.g., including tire wheels) are mechanically separated. In FIG. 1, only one of tire wheels 99 is illustrated, and the illustration of the other tire wheels 99 is omitted. The steer-by-wire system 90 includes a reaction force device 70, a turning device 80, and a torque sensor 94.

The reaction force device 70 includes a reaction-force-use rotary electric machine 78, a reaction-force-use power converter 77 for driving the reaction-force-use rotary electric machine 78, and a reaction-force-use reducer 79 for reducing an output of the reaction-force-use rotary electric machine 78. The reaction force device 70 is connected to a steering wheel 91 via a steering shaft 92. With the steer-by-wire system 90, a driver cannot directly sense a reaction force in response to steering. Therefore, the reaction-force-use rotary electric machine 78 rotates the steering wheel 91 so as to apply a reaction force in response to the steering, and gives an appropriate steering feeling to the driver.

The turning device 80 includes a turning-use rotary electric machine 88, a turning-use power converter 87 for driving the turning-use rotary electric machine 88, and a turning-use reducer 89 for reducing an output of the turning-use rotary electric machine 88. Rotation of the turning-use rotary electric machine 88 is transmitted from the turning-use reducer 89 to the tire wheels 99 via a pinion gear 96, a rack shaft 97, tie rods 98, and knuckle arms 985. Specifically, rotational movement of the pinion gear 96 is converted into linear movement of the rack shaft 97, and the tie rods 98 provided at both ends of the rack shaft 97 reciprocate the knuckle arms 985, thereby to turn the tire wheels 99.

The torque sensor 94 detects a steering input of the driver applied to the steering shaft 92 on a basis of a torsional displacement of a torsion bar. A detection value T_sns of the torque sensor 94 is input to the steering control device 200.

Steering angle of the steering wheel 91 is defined with respect to a neutral position of the steering wheel 91. For example, the steering angle of the steering wheel 91 is positive when the steering wheel 91 is rotated with respect to the neutral position in a clockwise (CW) direction and negative when the steering wheel 91 is rotated with respect to the neutral position in a counter clockwise (CCW) direction illustrated in FIG. 1. Correspondingly, positive and negative of steered angle of the tire wheel 99 are defined. Angular velocity is defined with the same sign (positive, negative) as the angle. The detection value T_sns of the torque sensor 94 when the driver turns the steering wheel 91 in the CW direction is positive.

Output torque of the reaction force device 70 when the steering wheel 91 is rotated in the CW direction by the reaction force device 70 is also positive. When the driver retains the steering wheel 91 while the output torque of the reaction force device 70 is acting in the CW direction, the driver applies torque in the CCW direction, and accordingly, the detection value T_sns of the torque sensor 94 becomes negative.

The steering control device 200 includes, as its main components, microcomputers and the like. A CPU, a ROM, a RAM, an I/O, a bus line connecting these components, and the like of the microcomputer are provided inside the steering control device 200. The steering control device 200 may execute a respective process as a software process or a hardware process or a combination of a software process and a hardware process. The steering control device 200 may execute the software process by the CPU executing a program stored in a memory device such as a computer-readable non-transitory tangible storage medium, for example, a ROM. The steering control device 200 may execute a process by a dedicated electronic circuit.

As illustrated in FIG. 1, in the specific embodiments, the reaction force device controller 270 and the turning device controller 280 are provided in a physically separated state. The two controllers 270 and 280 cooperate with each other to function as the steering control device 200 by communicating information with each other via a vehicle network such as CAN communication, a dedicated communication line and the like.

For example, as indicated by the two-dot chain line, the reaction force device 70 includes the reaction force device controller 270, a reaction-force-use power converter 77, and a reaction-force-use rotary electric machine 78 which are provided as an integrated configuration. Similarly, the turning device 80 includes the turning device controller 280, a turning-use power converter 87, and a turning-use rotary electric machine 88 which are provided as an integrated configuration. This kind of so-called a "machine-electric integrated type" motor structure is well known in the field of electric power steering devices.

Figure 2:
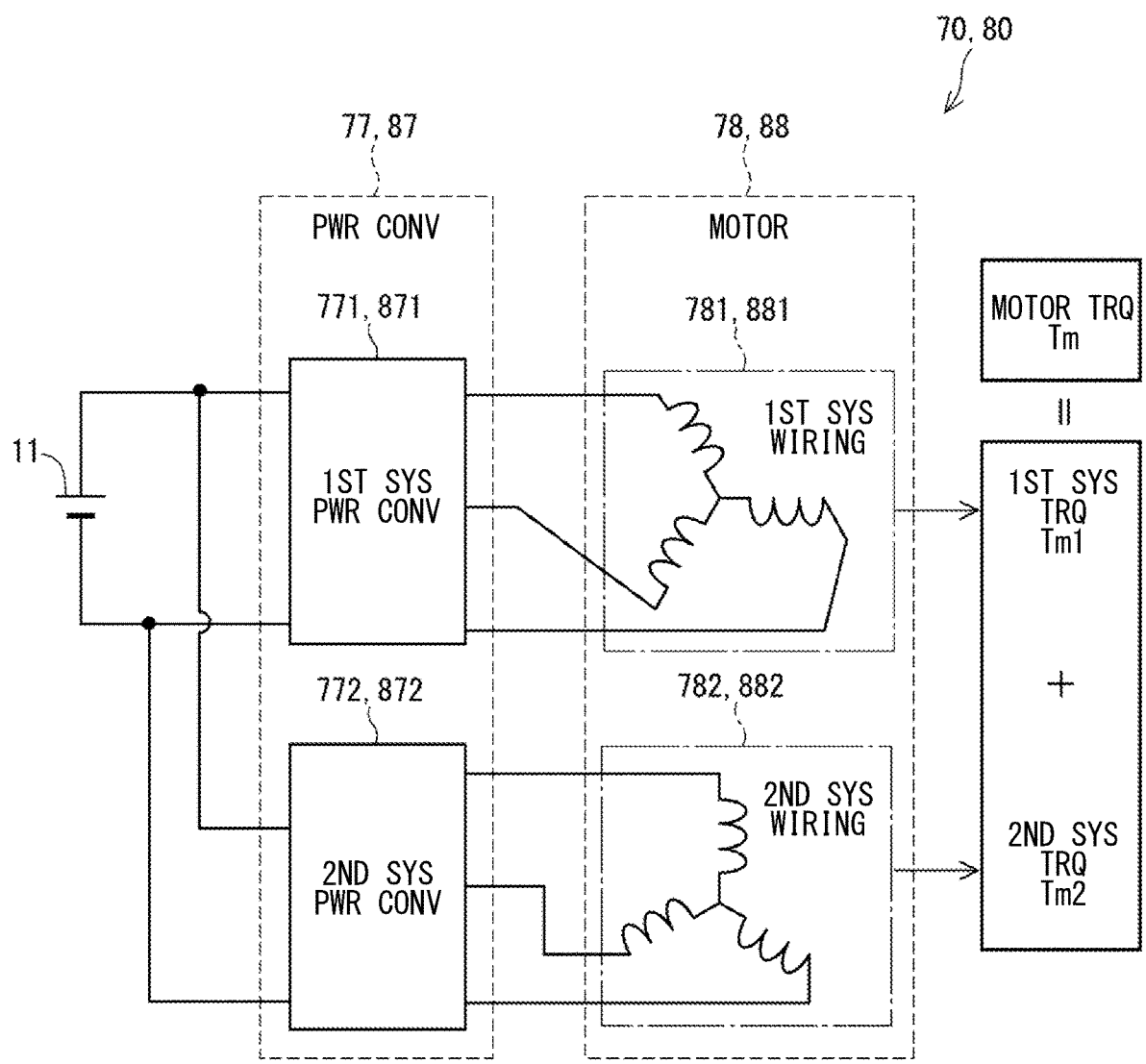
FIG. 2 is a diagram illustrating a schematic configuration of a reaction force device and a turning device provided in two systems.

Next, with reference to FIG. 2, configurations of the power converters 77 and 87 and the rotary electric machines 78 and 88 in the reaction force device 70 and the turning device 80 will be described specifically. Since the reaction force device 70 and the turning device 80 have a similar configuration, FIG. 2 illustrate reference signs for the both of the reaction force device 70 and the turning device 80. In the following description, the phrases "reaction-force-use" and "turning-use" may be omitted, and the reference signs of the components of the reaction force device 70 may be used as representatives of the both. It is to be understood that the description of the reaction force device 70 gives the description of the turning device 80 by reference sign replacements.

The rotary electric machine 78 according to the specific embodiments is provided as three-phase brushless motors of two systems, and the power converter 77 is provided as three-phase inverters of the two system. The rotary electric machines 78 include a first system winding 781 and a second system winding 782 as windings of the two systems. The windings 781 and 782 of the two systems are arranged to have phase shift by an electrical angle of 30 degrees, for example. A torque Tm output by the rotary electric machine 78 is the sum of a first system torque Tm1 generated by energizing the first system winding 781 and a second system torque Tm2 generated by energizing the second system winding 782.

The power converter 77 includes a first system power converter for energizing the first system winding 781 and a second system power converter 772 for energizing the second system winding 782. In the example of FIG. 2, each of the two-system power converters 771 and 772 converts a direct-current (DC) power supplied from a common (shared) battery 11 into a three-phase alternating-current (AC) power. In another example, the power converters 771, 772 may be connected to respective individual batteries.

Next, basic configurations of the reaction force device controller 270 and the turning device controller 280 will be described with reference to FIG. 3 and FIG. 4. The description of this basic configuration is for understanding of general controls of the reaction force device 70 and the turning device 80 in the steer-by-wire system 90, in advance of the description of control configurations specific to the first and second embodiments illustrated in FIGS. 5 and 14. Symbols of parameters relating to the output of the reaction force device 70 are provided with "r", and symbols of parameters relating to the output of the turning device 80 are provided with "t". Hereinafter, the reference numerals "70" and "80" of the reaction force device 70 and the turning device 80 may be omitted.

Figure 3:
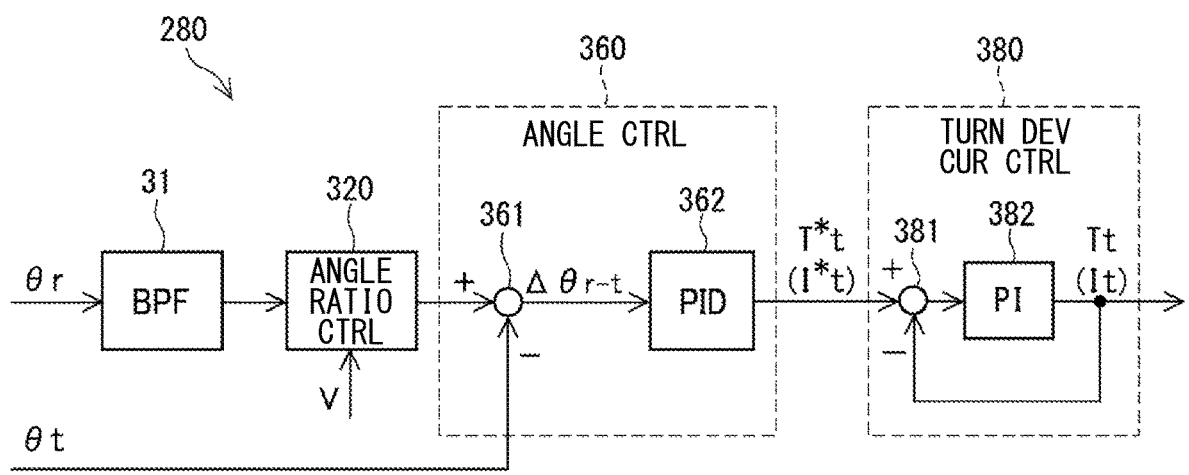
FIG. 3 is a block diagram illustrating a basic configuration of a turning device controller.
Figure 4:
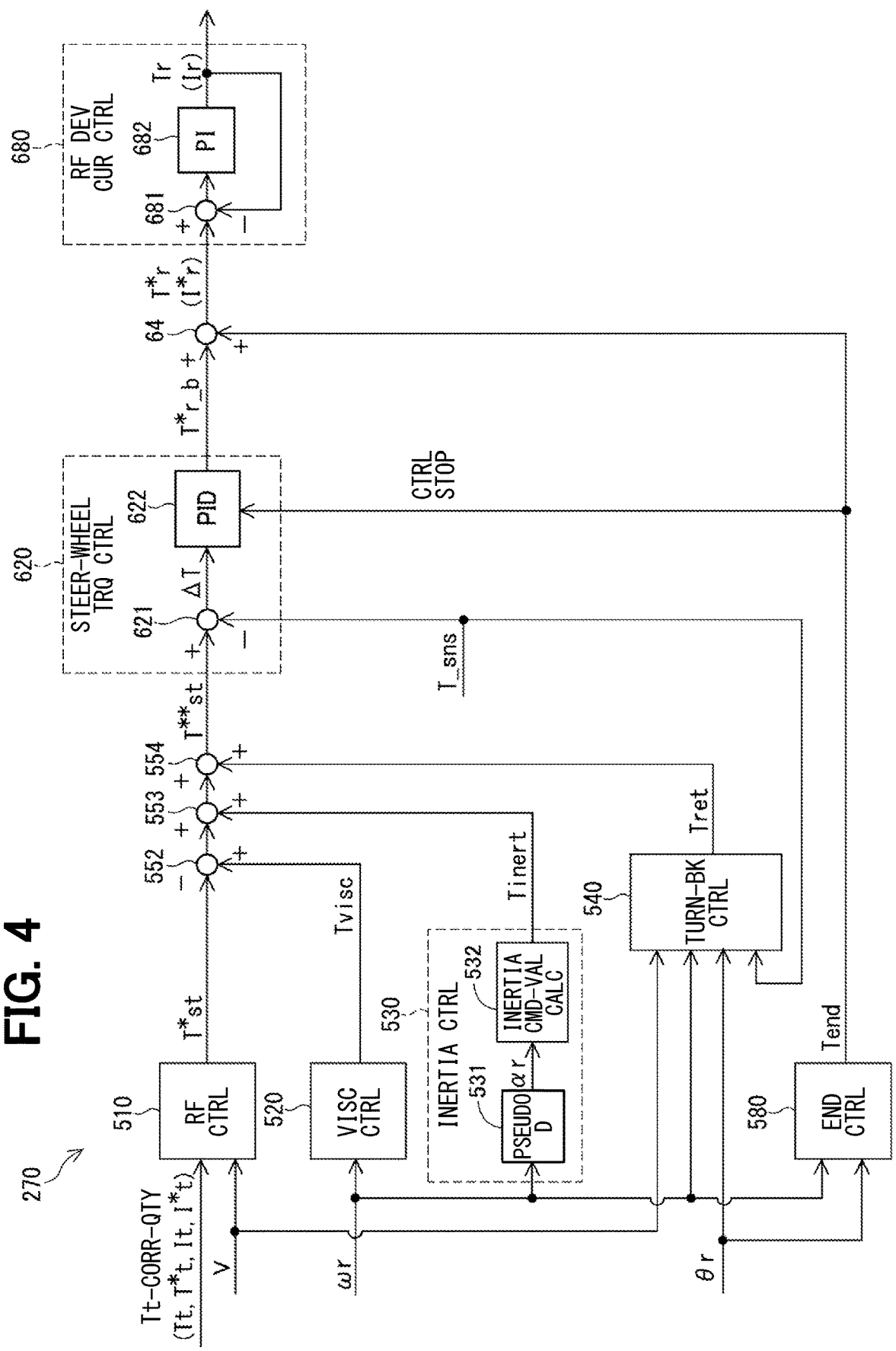
FIG. 4 is a block diagram illustrating a basic configuration of a reaction force device controller.

In FIG. 3 and FIG. 4, values such as angle θr and angular velocity ωr of the reaction force device and angle θt of the turning device 80 are values after conversion, wherein the conversion is multiplication or division of the rotation angle of the rotary electric machine 78, 88 by a reduction ratio of the reducer 79, 89. FIG. 3 illustrates the schematic configuration of the turning device controller 280. The angle θr of the reaction force device is input to an angle ratio controller 320 via a band pass filter (BPF) 31. The angle ratio controller 320 calculates the angle ratio between the reaction force device 70 and the turning device 80 according to the angle θr and/or vehicle speed V.

A difference calculator 361 of an angle controller 360 calculates an angle difference Δθr–t between the value obtained by multiplying the angle θr of the reaction force device 70 by the angle ratio and the angle θt of the turning device 80. A PID controller 362 calculates a turning torque command value T*t or a current command value I*t of the turning-use rotary electric machine 88 corresponding to the turning torque command value T*t so that the angle difference Δθr–t approaches 0. A turning device current controller 380 includes a difference calculator 381 and a PI controller 382, and controls the current to be supplied to the turning-use rotary electric machine 88 by feedback control of the turning torque Tt or the current It.

To be precise, the angle difference Δθ calculated by the difference calculator 361 is a difference between "the value obtained by multiplying the angle θr of the reaction force device by the angle ratio" and the angle θt of the turning device. However, in the present description, "the value obtained by multiplying the angle θr of the reaction force device by the angle ratio" is regarded as "the angle θr of the reaction force device 70", and "the difference between the angle θr of the reaction force device and the angle θt of the turning device" is referred to as "angle difference Δθr–t".

FIG. 4 illustrates a basic configuration of the reaction force device controller 270. A steering wheel torque controller 620 calculates a basic reaction force torque command value T*r_b being a basic value of a reaction force torque command value on a basis of torque command values that, respectively, are calculated by a reaction force controller 510, a viscosity controller 520, an inertia controller 530, and a turn-back controller 540.

By a reaction force control that is based on "a physical quantity corresponding to the output torque of the turning device", the reaction force controller 510 calculates a reaction force command value of the reaction force device. The reaction force controller 510 further calculates a turning torque command value T*st by multiplying the reaction force command value Trf by a vehicle speed gain corresponding to the vehicle speed V. Herein, "the physical quantity corresponding to the output torque of the turning device" may be the turning torque Tt, the turning torque command value T*t, the current command value I*t, a current It flowing to the turning-use rotary electric machine 88, or the like. Hereinafter, "the physical quantity corresponding to the output torque of the turning device" will be abbreviated as a "turning torque corresponding quantity".

The viscosity controller 520 calculates a viscosity command value Tvisc of the reaction force device by a viscosity control, wherein the viscosity control is based on "a physical quantity corresponding to the rotational angular velocity ωr of the reaction force device". In FIG. 4, the symbol "ωr" is illustrated as a representative of "the physical quantity corresponding to the rotational angular velocity ωr of the reaction force device". In the description, the phrase "rotational angular velocity ωr" is also simply referred to as "angular velocity ωr".

Figure 5:
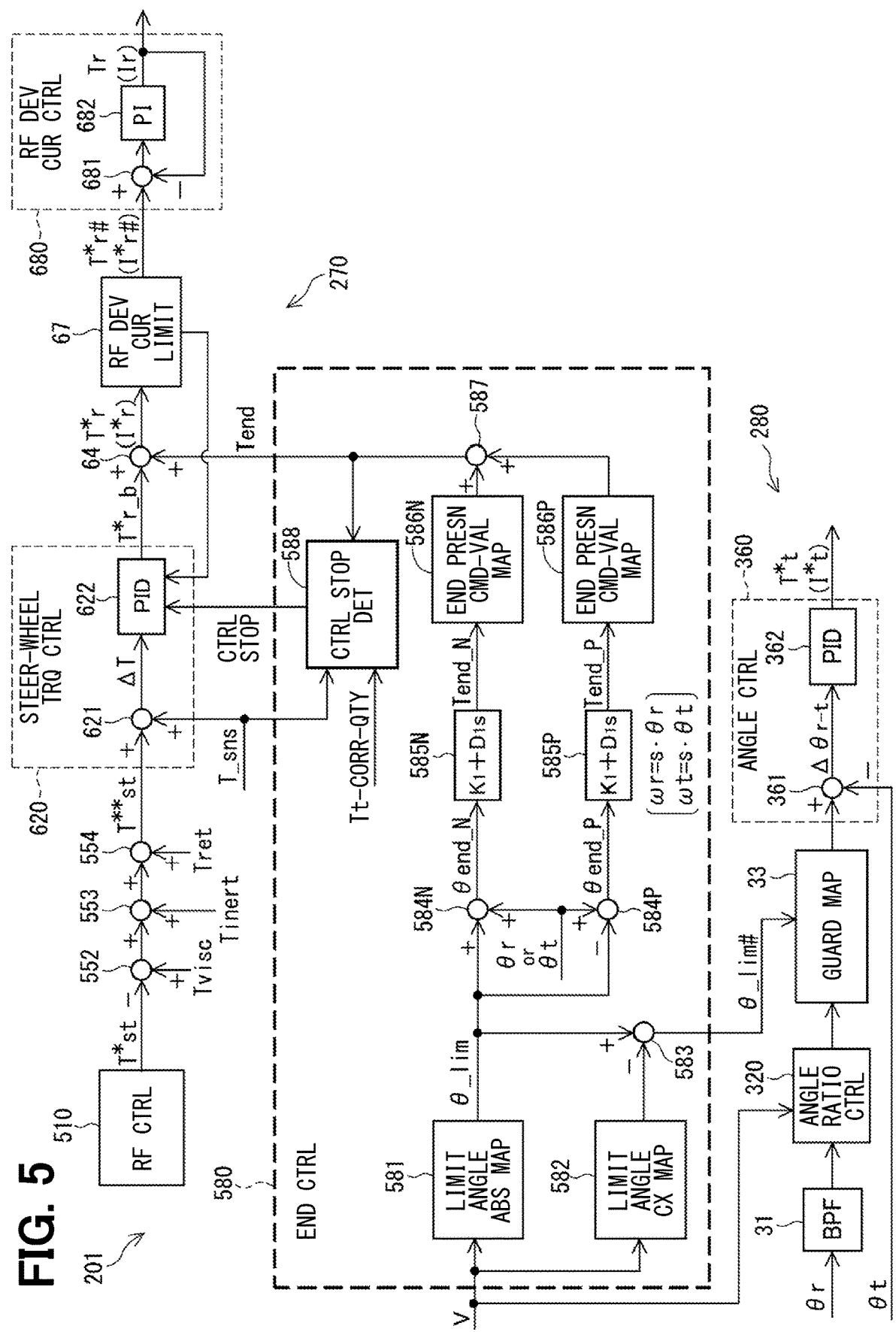
FIG. 5 is a block diagram of a steering control device of a first embodiment.

As illustrated in FIG. 5, the inertia controller 530 includes a pseudo differentiator 531 and an inertia command value calculator 532. The pseudo differentiator calculates a rotational angular acceleration αr from a change rate of the rotational angular velocity ωr. The inertia command value calculator 532 performs inertia command value calculation based on the rotational angular acceleration αr. The inertia controller 530 calculates an inertia command value Tinert of the reaction force device, by an inertial control that is based on "a physical quantity corresponding to the rotational angular acceleration αr of the reaction force device". In FIG. 5, the symbol "ωr" is illustrated as a representative of "the physical quantity corresponding to the rotational angular velocity ωr of the reaction force device".

The turn-back controller 540 calculates a turn-back command value Tret for acting in a direction to turn back the steering wheel 91 to the neutral position, on a basis of the angle θr and the angular velocity ωr of the reaction force device, the vehicle speed V, and the detection value T_sns of the torque sensor 94.

In the adders 552, 553, 554, the viscosity command value Tvisc, the inertia command value Tinert, and the turn-back command value Tret are sequentially added to a sign inversion value (−T*st) of the steering torque command value T*st. The value after the addition by the adder 554 is input to the steering wheel torque controller 620 as "a target value T**st based on the steering torque command value T*st".

A difference calculator 621 of the steering wheel torque controller 620 calculates a torque difference $\Delta T_{FB}$ between the target value Tst and the detection value T_sns of the torque sensor 94. A PID controller 622 performs a PID control so that the torque difference ΔT approaches 0. In this way, the steering wheel torque controller 620** calculates a reaction force torque command value T*r by servo control so that the detection value T_sns of the torque sensor 94 follows the target value T**st.

The end controller 580 calculates an end presentation command value Tend on a basis of the angle θr and the angular velocity ωr of the reaction force device. When an absolute value |θr| of the angle of the reaction force device or an absolute value |θt| of the angle of the turning device is equal to or greater than a predetermined limit angle value θ_lim, the end controller 580 calculates an end presentation command value Tend of the reaction force device to cause the driver to be unable to turn the steering wheel 91 to the limit angle value θ_lim or more.

As described above regarding the angle controller 360, it is possible to appropriately multiply and/or divide the angle θr of the reaction force device and the angle θt of the steered device by conversion factors for comparison. The specific embodiments are based on the promise that the angle θr of the reaction force device and the angle θt of the turning device multiplied by the conversion factors are used when compared with the limit angle values θ_lim. In the embodiments, "the angle θr of the reaction force device" and "the angle θt of the turning device" refer to values that have been converted appropriately, regardless of the specific reduction ratios of the reaction-force-use reducer 79 and the turning-use reducer 89. In the following, "the reaction force device angle θr" and "the turning device angle θt" are treated in the same level and are referred to as "angle θr, θt of the reaction force device or the turning device".

The end presentation command value Tend is added to the reaction force torque command value T*r by an adder 64. Further, the end presentation command value Tend is notified to the PID controller 622 of the steering wheel torque controller 620 as a signal for commanding control stop. This will be described in detail later.

A reaction force device current controller 680 includes a difference calculator 681 and a PI controller 682. By a feedback control of the reaction force torque Tr or the current Ir, the reaction force device current controller 680 controls an electric current flowing to the reaction-force-use rotary electric machine 78, on a basis of the reaction force torque command value T*r.

First Embodiment

Figure 9:
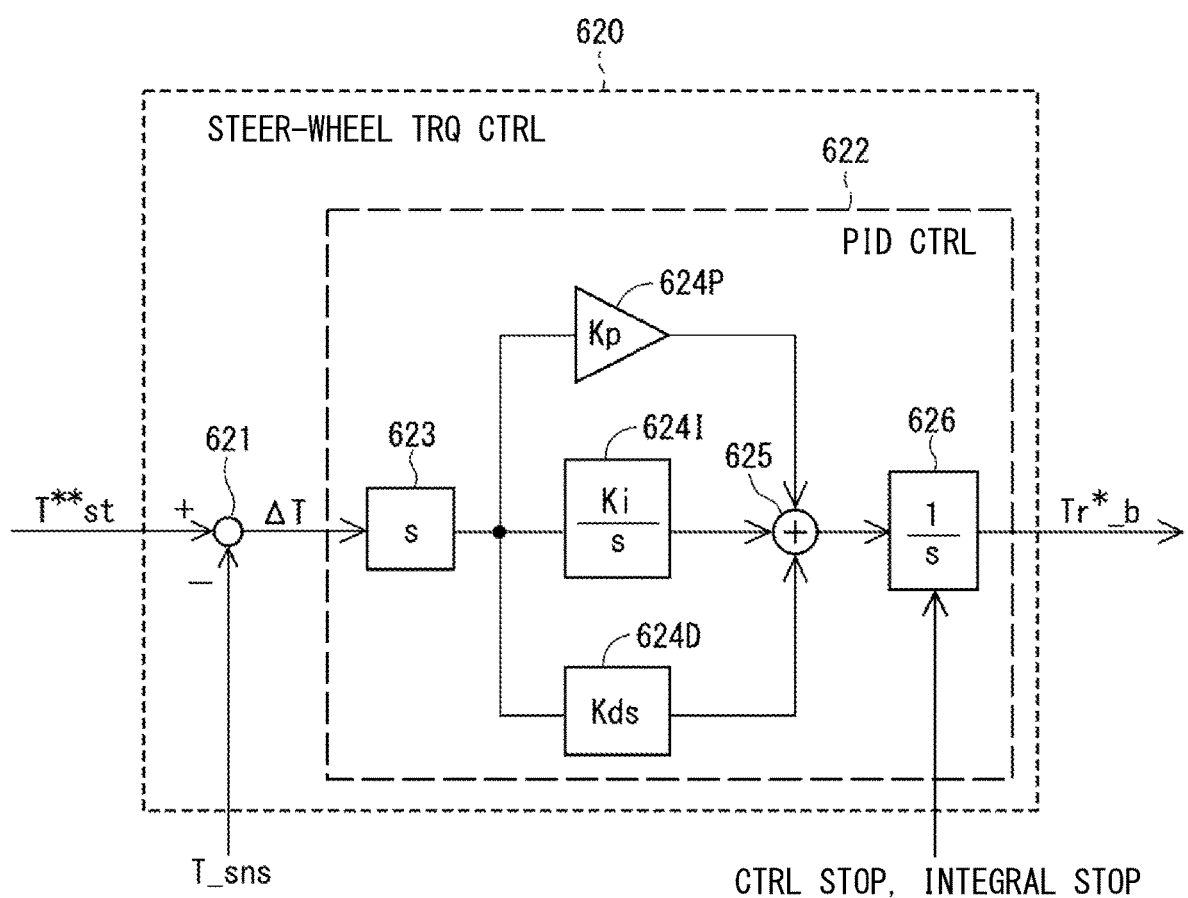
FIG. 9 is a diagram illustrating a control block diagram of a PID controller of a steering wheel torque controller.
Figure 10:
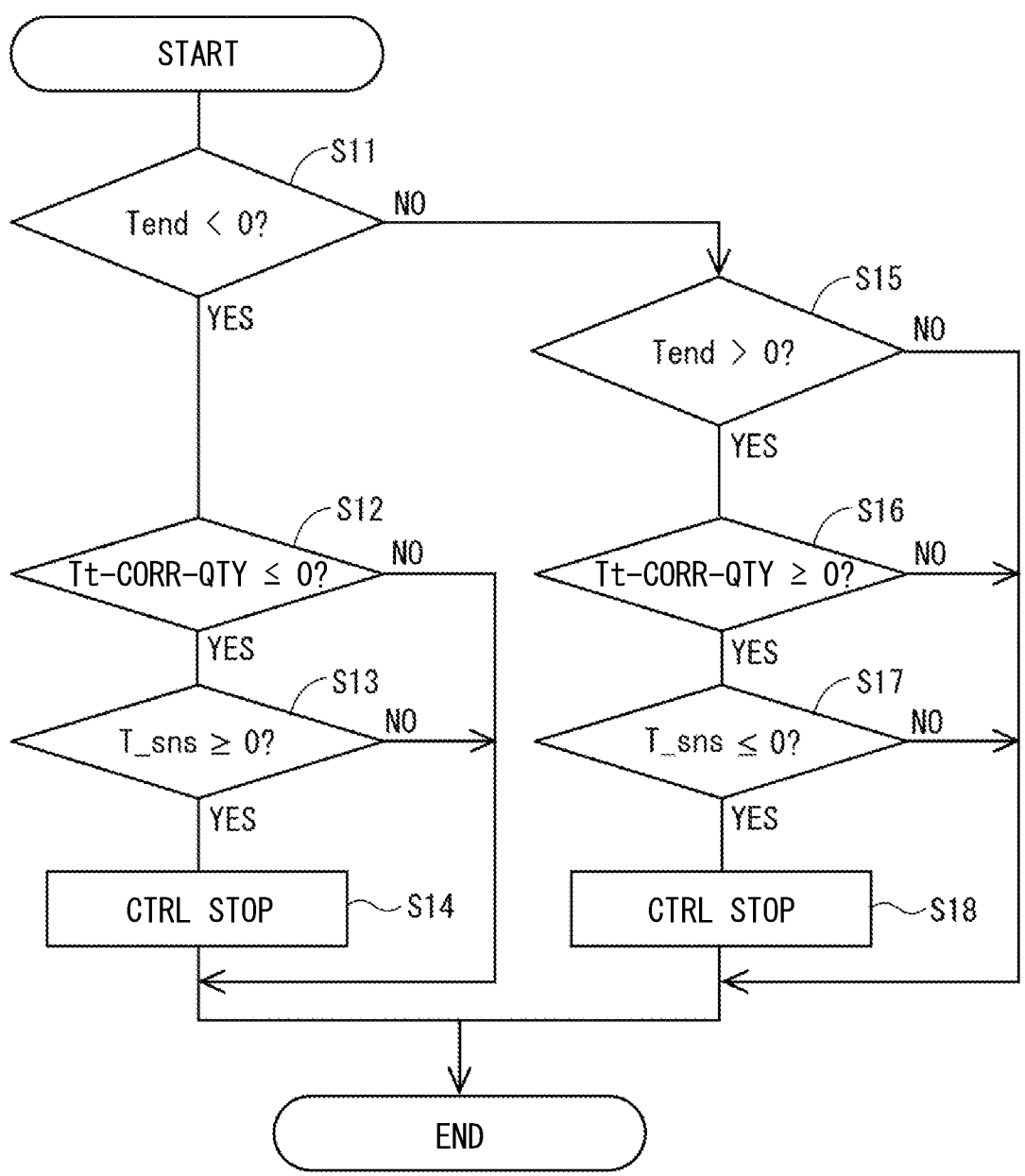
FIG. 10 is a diagram illustrating a flowchart of control stop determination processing.

The reference signs of the steering control devices of the first and second embodiments are "201" and "202", respectively. Now, the control configuration of the steering control device 201 of the first embodiment will be described with reference to FIGS. 5 to 10. FIG. 5 illustrates details of the configuration of the end controller 580 among the basic configurations of the reaction force device controller 270 illustrated in FIG. 4. The reaction force controller 510, the viscosity controller 520, the inertia controller 530, and the turn-back controller 540 are omitted from FIG. 4. FIGS. 6A to 8 illustrate concrete examples of maps used in the configuration of FIG. 5. FIG. 9 illustrates a concrete configuration regarding the control stop of the steering wheel torque controller 620. FIG. 10 illustrates a flowchart of the control stop determination processing.

Figure 6A:
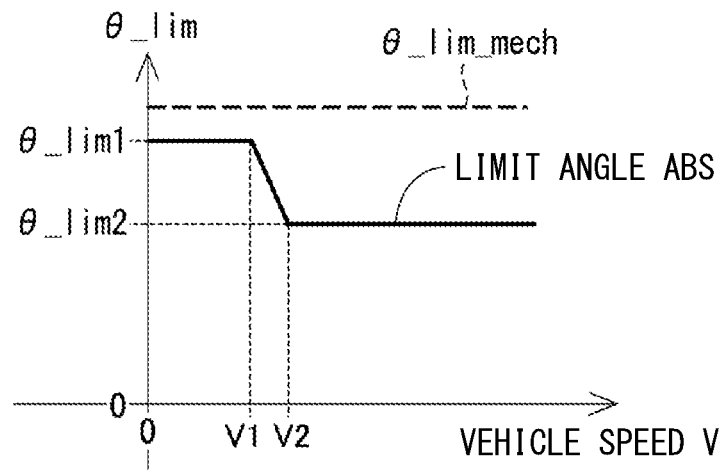
FIG. 6A is a diagram illustrating a limit angle absolute value map.

In a limit angle absolute value map 581 of the end controller 580, the absolute value of the limit angle value θ_lim is variably set according to vehicle speed V, that is, speed of the vehicle. For example, as illustrated in FIG. 6A, a relatively large absolute value θ_lim2 is set in a low speed range where the vehicle speed V is V1 or lower, and a relatively small absolute value θ_lim2 is set in a high speed range where the vehicle speed V is V2 or higher. In the region from the vehicle speed V1 to V2, the absolute value of the limit angle value θ_lim gradually changes from the absolute value θ_lim1 to the absolute value θ_lim2. Further, a maximum limit angle absolute value θ_lim1 is set to a value smaller than an angle θ_lim_mech obtained by converting a mechanical limit angle of the turning device 80.

Figure 6B:
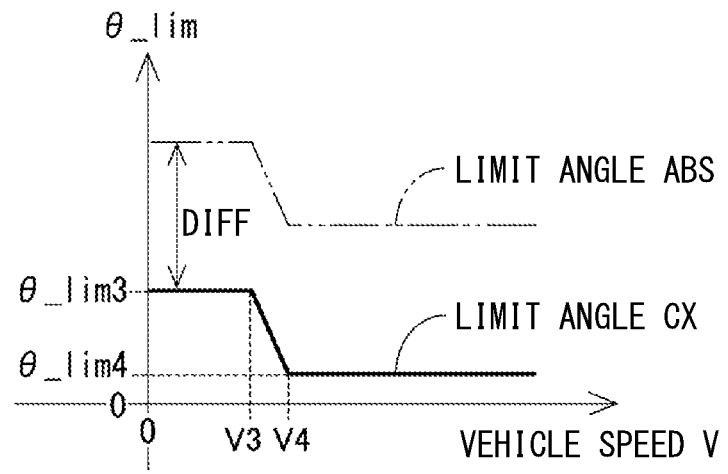
FIG. 6B is a diagram illustrating a limit angle correction value map.

In the limit angle correction value map 582, a correction value of the limit angle value θ_lim is variably set according to the vehicle speed V. For example, as illustrated in FIG. 6B, a relatively large correction value θ_lim3 is set in a low speed range where the vehicle speed is V3 or lower, and a relatively small correction value θ_lim4 is set in a high speed range where the vehicle speed is V4 or higher. In the region from the vehicle speed V3 to V4, the correction value gradually changes from the correction value θ_lim3 to the correction value θ_lim4. The vehicle speeds V3 and V4 may be equal to the vehicle speeds V1 and V2 of the limit angle absolute value map 581. The difference between the correction value θ_lim3 and the correction value θ_lim4 may be equal to the difference between the absolute value θ_lim1 and the absolute value θ_lim2 of the limit angle absolute value map 581.

Figure 7:
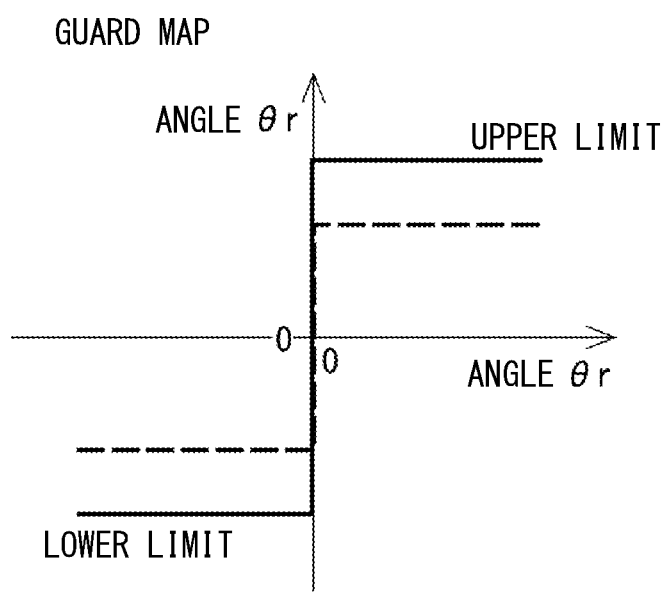
FIG. 7 is a diagram illustrating an upper-lower limit guard map for angle of a reaction force device.

The difference obtained by subtracting the limit angle correction value from the limit angle absolute value is input to the upper lower limit guard map 33 of the turning device controller 280 as the corrected limit angle θ_lim #. As illustrated in FIG. 7, in the upper lower limit guard map 33, the upper lower limit guard value for the angle θr of the reaction force device is changed according to the corrected limit angle θ_lim #.

Hereinafter, the limit angle value itself set in the limit angle absolute value map 581 is referred to as "positive limit angle value θ_lim", and the sign inversion value of the limit angle value set in the limit angle absolute value map 581 is referred to as "negative limit angle value (−θ_lim)". Further, "the positive limit angle value θ_lim" and "the negative limit angle value (−θ_lim)" which are appropriately selected according to the sign of the angle θr, θt of the reaction force device or the turning device, specifically, the direction of the steering angle with respect to the neutral position "θ_lim)", are collectively referred to as "limit angle adjustment value (±θ_lim)". A limit angle adjustment value is defined as "the limit angle value having the sign that has been adjusted according to the direction of the steering angle with respect to the neutral position".

In the difference calculator 584N, the positive limit angle value θ_lim is added to the angle θr, θt of the reaction force device or the turning device to calculate the end angle θend_N. In this embodiment, due to the guard of the end presentation command value map 586N, only the end presentation command value Tend_N corresponding to the negative angle θr, θt is validly used finally. Specifically, from the viewpoint of a final value of the end presentation command value Tend, the negative angle θr, θt and the positive limit angle value θ_lim are added. Therefore, although the difference calculator 584N is illustrated as an adder in a formal aspect, this is interpreted as "difference calculator 584N" in a substantive aspect.

The calculator 585N multiplies the end angle θend_N by "K1+D1s" to calculate a pre-guard end presentation command value Tend_N. Here, K1 is a proportional term coefficient, D1 is a differential term coefficient, and s is a differential operator. The calculator 585N adds a value obtained by multiplying the angle difference by the proportional term coefficient K1 and a value obtained by multiplying the angular velocities ωr and ωt of the reaction force device or the turning device by the differential term coefficient D1.

Figure 8A:
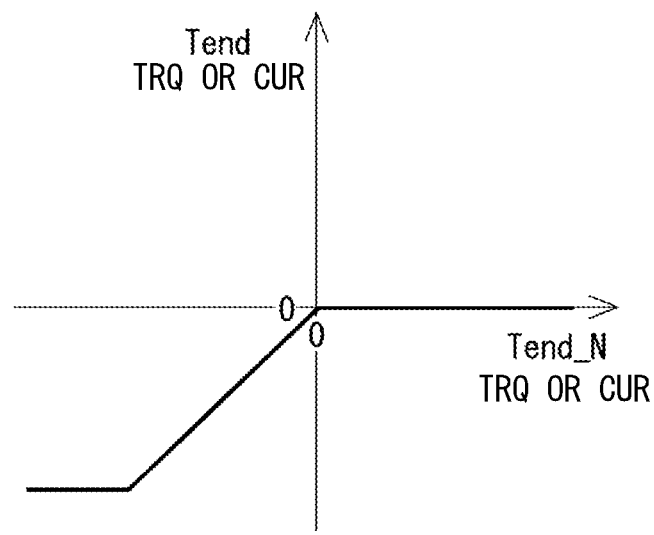
FIG. 8A is a diagram illustrating an end presentation command value map for guarding in a positive region.

As illustrated in FIG. 8A, in the end presentation command value map 586N, the positive values of the pre-guard end presentation command value Tend_N are guarded with 0, and only negative values are left. Accordingly, the value obtained by the calculation is a negative value of the post-guard end presentation command value Tend_N corresponding to the negative angle θr, θt of the reaction force device or the turning device. The horizontal axis and the vertical axis of the end presentation command value map are torques or currents. The end presentation command value may be set as a torque value. Alternatively, the end presentation command value may be set as an electric current value and converted into a torque value when subject to comparison, addition and/or subtraction with another torque value.

Similarly, in the difference calculator 584P, the negative limit angle value (−θ_lim) is added to the angle θr, θt of the reaction force device or the turning device to calculate an end angle θend_P. In this embodiment, due to the guard of the end presentation command value map 586P, only the end presentation command value Tend_P corresponding to the positive angle θr, θt is validly used finally. Specifically, from the viewpoint of the final end presentation command value Tend, the positive angle θr, θt and the negative limit angle value (−θ_lim) are added. Therefore, although the difference calculator 584P is illustrated as an adder in a formal aspet, this is interpreted as "difference calculator 584P" in a substantive aspect.

Figure 8B:
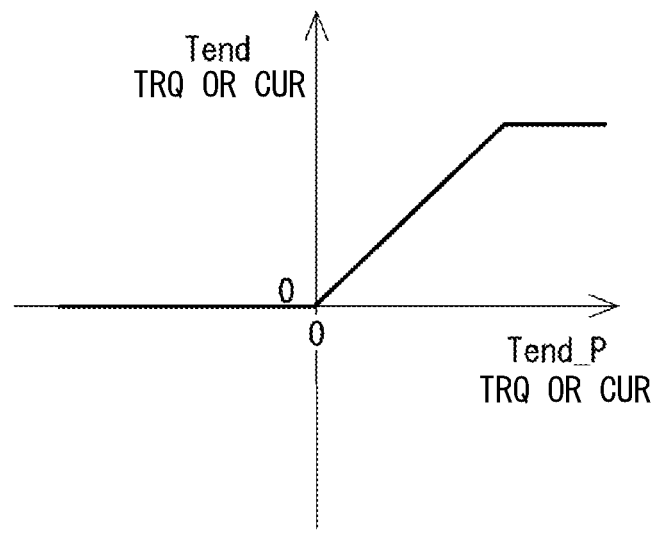
FIG. 8B is a diagram illustrating an end presentation command value map for guarding in a negative region.

The calculator 585P multiplies the end angle θend_P by "K1+D1s" to calculate a pre-guard end presentation command value Tend_P. As illustrated in FIG. 8B, in the end presentation command value map 586P, negative values of the pre-guard end presentation command value Tend_P are guarded with 0, and only positive values are left. Accordingly, the value obtained by the calculation is a positive value of the post-guard end presentation command value Tend_P corresponding to the positive angle θr, θt of the reaction force device or the turning device.

In the adder 587, the positive and negative post-guard end presentation command values Tend_P and Tend_N are added and the value obtained by the addition is output as an end presentation command value Tend. The end presentation command value Tend is added to the reaction force torque command value T*r by an adder 64. Further, the end presentation command value Tend is notified to the control stop determiner 588.

The control stop determiner 588 acquires the turning device Tt corresponding quantity, the detection value T_sns of the torque sensor 94, and the end presentation command value Tend. On the basis of these items of information, the control stop determiner 58 performs the determination processing illustrated in FIG. 10 to make a determination as to the control stop of the steering wheel torque controller 620.

With reference to FIG. 9, description of a concreate configuration regarding the control stop will be given as supplemental description. FIG. 9 illustrates a configuration example of the PID controller 622 of the steering wheel torque controller 620. This configuration is application of a configuration of an assist controller disclosed in FIG. 4, paragraphs [0034] and [0035] of Japanese Patent No. 6299087 incorporated herein by reference. The PID controller 622 includes a differential calculator 623, a proportional controller 624P, an integral controller 624I, a differential controller 624D, an adder 625, and an integral calculator 626, and performs feedback-control of the output torque of the reaction force device 70.

The differential calculator 623 differentiates the input torque difference ΔT. The proportional controller 624P performs P-control using a proportional gain Kp, and the integral controller 624I performs I-control using an integral gain Ki. The differential controller 624D performs D-control using a differential gain Kd. The adder 625 adds outputs of the P-control, the I-control, and the D-control.

The integral calculator 626 is provided at a last stage of the steering wheel torque controller 620, and integrates the added value of the adder 625 and outputs the value obtained by the integral. In this configuration, when the control of the steering wheel torque controller 620 is stopped, the integral calculation by the integral calculator 626 is stopped. While the integral calculation is being stopped, the feedback control processing by the controllers 624P, 624I, and 624D is continued.

The description returns to FIG. 5. A reaction force device current limiter 67 is provided in process of calculating the reaction force torque command value T*r. The reaction force device current limiter 67 limits the reaction force device current Ir to a value equal to or less than a current limit value for the purpose of overheating protection, power limitation, power drop prevention and the like of the reaction force device 70. The reaction force torque command value and the reaction force device current command value before the limiting by the reaction force device current limiter 67 are denoted as T*r and I*r, respectively. The reaction force torque command value and the reaction force device current command value after the limiting are denoted as T*r # and I*r #, respectively. When the absolute value |I*r| of the reaction force device current command value before the limiting exceeds the current limit value, an output of the reaction force device 70 is limited. When the current limiting is performed by the reaction force device current limiter 67, the PID controller 622 of the steering wheel torque controller 620 is also notified of this and the control (integral) is stopped.

Next, the control stop determination processing by the control stop determiner 588 of the end controller 580 will be described with reference to the flowchart of FIG. 10. In the description of the flowchart, a symbol "S" denotes a step. In S11, it is determined whether the end presentation command value Tend is smaller than 0, that is, is a negative value. In the case of YES in S11, this corresponds to a right-tuned state of the steering wheel 91.

In this state, when the turning torque corresponding quantity is 0 or less and the detection value T_sns of the torque sensor 94 is 0 or more, specifically, when the turning torque corresponding quantity and the detection value T_sns are values corresponding to the direction toward the right end (i.e., a direction approaching the right end), the determination in S12 results in YES and the determination in S13 results in YES, and the processing proceeds to S14. In S14, the end controller 580 stops the control of the steering wheel torque controller 620, specifically, stops the integral. In the case of NO in S12 or S13, specifically, when the turning torque corresponding quantity or the detection value T_sns is a value corresponding to a direction away from the right end, the control is continued or the control stop is released.

In the case of NO in S11, it is determined in S15 whether the end presentation command value Tend is larger than 0. The case of YES in S15 corresponds to the state where the steering wheel 91 is turned to the left. The case of NO in S15 corresponds to a steering-wheel-retained or intermediate state, and the processing is ended.

In this state, when the turning torque corresponding quantity is 0 or more and the detection value T_sns of the torque sensor 94 is 0 or less, specifically, when the turning torque corresponding quantity and the direction value T_sns are values corresponding to a direction toward the left end (i.e., a direction approaching the left end), the determinations in S16 and S17 each result in YES and the processing proceeds to S18. In S18, the end controller 580 stops the control, specifically, the integral, of the steering wheel torque controller 620. In the case of NO in S16 or S17, specifically, when the turning torque corresponding quantity or the direction value T_sns is a value corresponding to a direction away from the left end, the control is continued or the stop of the control is released.

In the above, when the determination in S11 or S15 results in YES, specifically, when the end presentation command value Tend having a sign corresponding to the direction of the steering angle is being output, this means that the absolute value of the angle |θr|, |θt| of the reaction force device or the turning device is equal to or greater than the limit angle value θ_lim.

Figure 11:
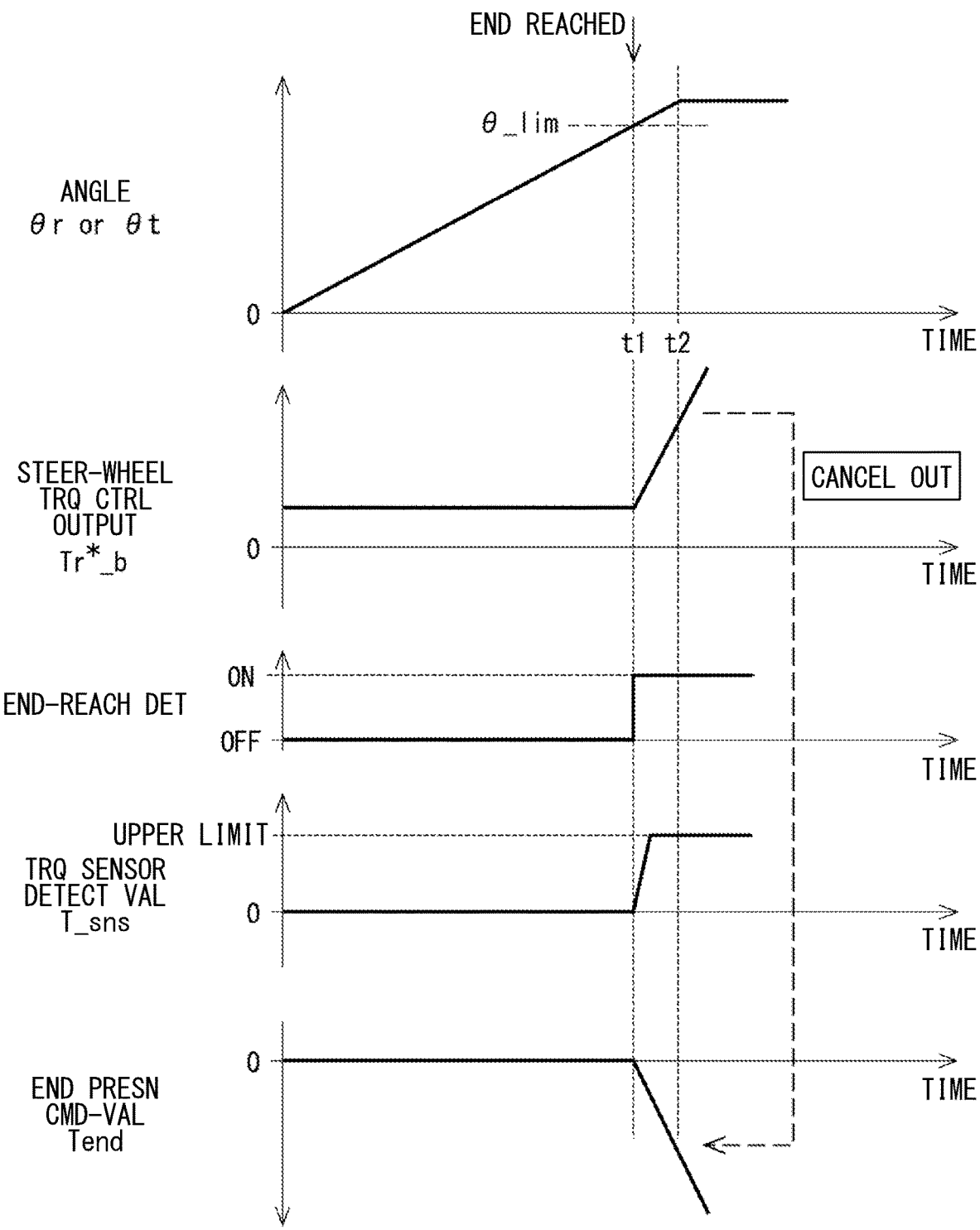
FIG. 11 is a diagram illustrating a time chart of an end control according to a comparative example 1.
Figure 12:
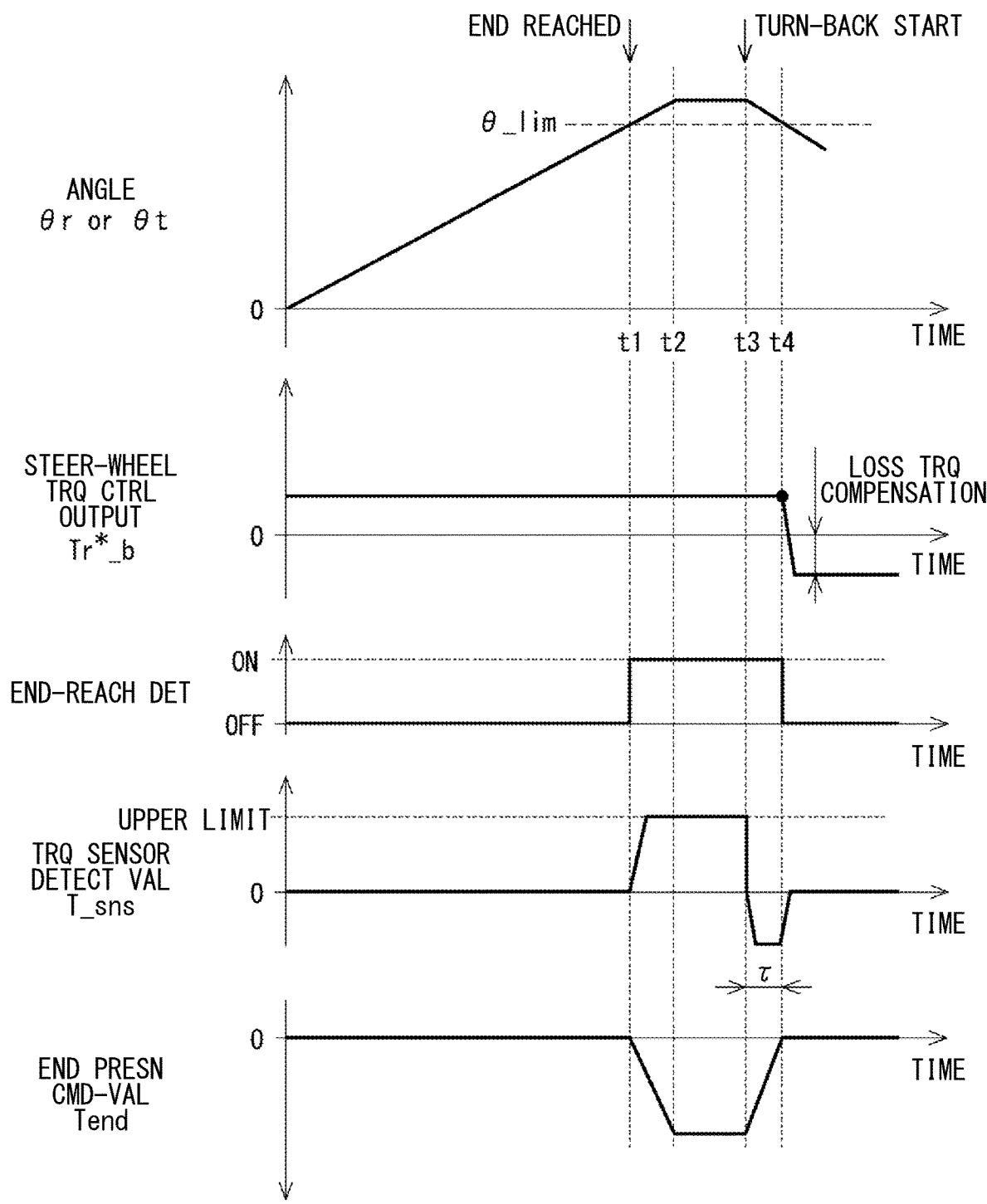
FIG. 12 is a diagram illustrating a time chart of an end control according to a comparative example 2.
Figure 13:
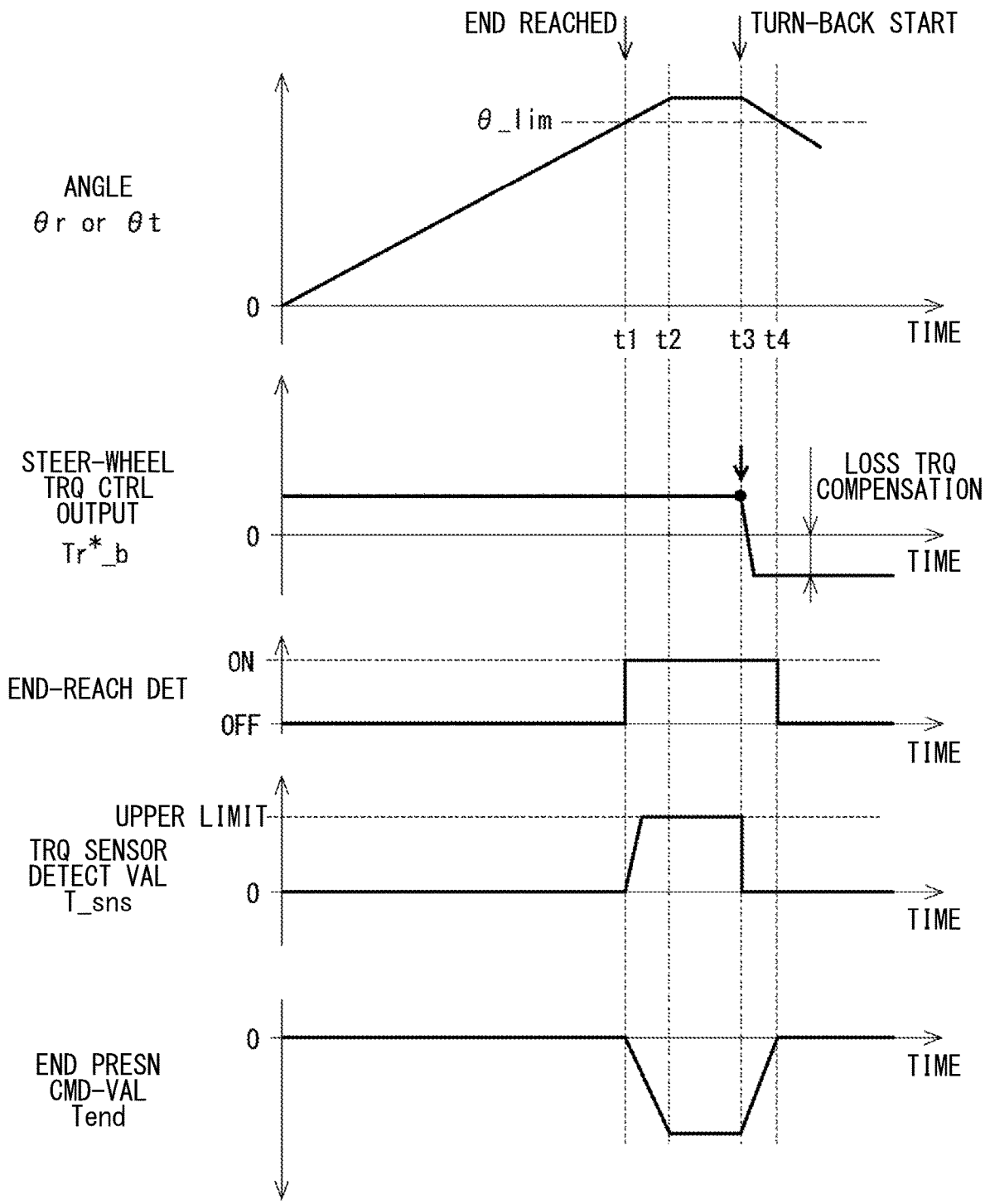
FIG. 13 is a diagram illustrating a time chart of an end control according to specific embodiments.

Next, with reference to the time charts of FIGS. 11 to 13, behaviors at a time of reaching the end according to comparative examples and the specific embodiments will be described. From the top, each of FIGS. 11 to 13 depicts changes in the angle θr, θt of the reaction force device or the turning device, the basic reaction force torque command value T*r_b being the output of the steering wheel torque controller 620, an end reach determination signal, the detection value T_sns of the torque sensor 94, and the end presentation command value Tend. The "θr" is used as the symbol of the angle in the description. The positive and negative signs of each quantity are described according to the drawings. The inverting of each sign provides description of cases of steering in the opposite direction.

In each of FIGS. 11 to 13, the angle θr increases from an initial stage and reaches the limit angle value θ_lim at a time t1, specifically, reaches the end at the time t1. At this time, an end reach determination signal switches over from OFF to ON. Further, the detection value T_sns of the torque sensor 94 increases from 0 to the upper limit value, and the end presentation command value Tend starts decreasing from 0 to the negative. After that, at time t2, the angle θr reaches the maximum value.

In the following description, "control stop" means stop of feedback control of the steering wheel torque controller 620 at the time when the end is reached; specifically, "control stop" means stop of the integral calculation. In Comparative Example 1 illustrated in FIG. 11, "control stop" is not executed even when the end is reached. After the time t1, the negative end presentation command value Tend is generated. However, by the feedback control of the steering wheel torque controller 620, the basic reaction force torque command value T*r_b is output so as to cancel the end presentation command value Tend. The angle θr is constant at the maximum value, and the end reach determination signal is kept ON. The detection value T_sns of the torque sensor 94 is merely given as the basic reaction force torque command value T*r_b is canceled by the end presentation command value Tend.

In the comparative example 2 illustrated in FIG. 12 and the specific embodiments illustrated in FIG. 13, the control stop is executed at the time of reaching the end, and accordingly, the output T*r_b of the steering wheel torque controller 620 is not increased but kept constant after the time t1. Also, from time t2 to time t3, the angle θr is substantially constant at the maximum value that depends on the input torque of the driver. During this time period, the absolute value |Tend| of the negative end presentation command value is maximum, and the detection value T_sns of the torque sensor 94 is constant at the upper limit value.

When the turning back is started at time t3 and the angle θr starts decreasing, the detection value T_sns of the torque sensor 94 becomes 0, and the absolute value |Tend| of the end presentation command value starts decreasing. When the angle θr becomes equal to or smaller than the limit angle value θ_lim at the time t4, the end reach determination signal switches over from ON to OFF. The comparative example 2 and the specific embodiments differ from each other in the timing at which the control stop of the steering wheel torque controller 620 is released and the output T*r_b starts reversion from (i) the value corresponding to the direction toward the end to (ii) the value corresponding to the turn back direction.

In the comparative example 2, the control stop is released at the timing when the end reach determination signal switches over from ON to OFF at time t4. The output T*r_b of the steering wheel torque controller 620 crosses zero from a positive value and shifts to a negative value. The difference between 0 and the negative value corresponds to a compensation of loss torque such as gear friction etc. In the comparative example 2, the detection value T_sns of the torque sensor 94 is negative during the time period τ from time t3 to time t4. Specifically, the steering wheel 91 becomes hard-to-rotate (also called "heavy") immediately after the start of the turn back from the end, and the driver feels as if the steering wheel 91 is adhered to the end.

In the specific embodiments, the control stop is released at the same time when the turn back is started at time t3, and the detection value T_sns of the torque sensor 94 is kept at 0 on and after time t3. Therefore, immediately after the start of the turn back from the end also, the driver can rotate the steering wheel 91 naturally, without feeling that the steering wheel 91 is hard to rotate (heavy).

Second Embodiment

Figure 14:
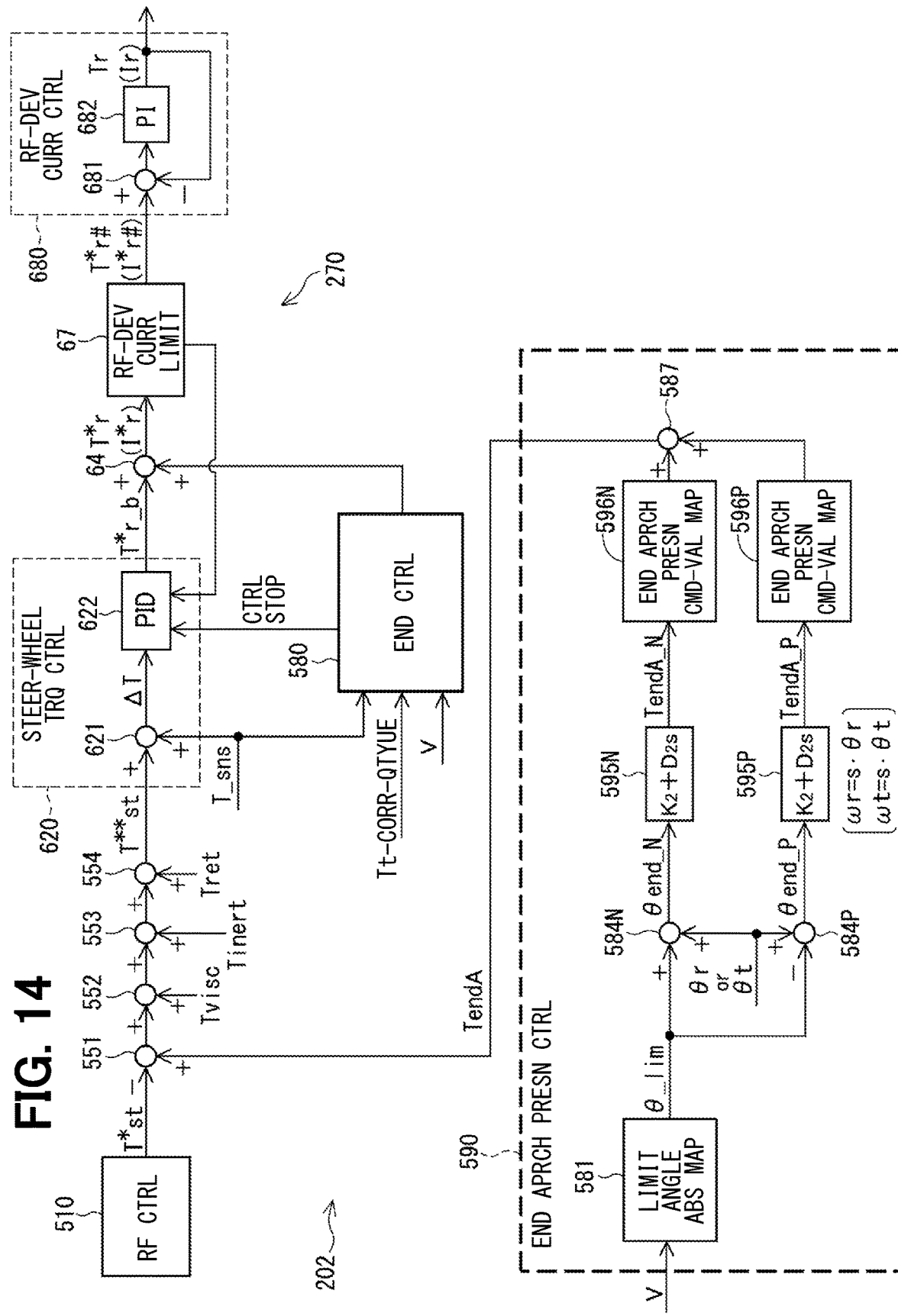
FIG. 14 is a block diagram illustrating a steering control device according to a second embodiment.

Next, a control configuration of a steering control device 202 of the second embodiment will be described with reference to FIG. 14. In addition to the configuration of the first embodiment, the second embodiment further includes an end approach presentation controller 590 that increases steering response in order to present the driver about the approach to the end. In other respects, the configuration of the steering control device 202 of the second embodiment is the same as that of the first embodiment, so the description of such aspects will be omitted.

The end approach presentation controller 590 calculates an end approach presentation command value TendA according to the angle θr, θt of the reaction force device or the turning device. The calculated end approach presentation command value TendA is added to the steering torque command value T*st by an adder 551 provided immediately next to the reaction force controller 510. This increases the steering response, so that the driver recognizes that the end will be reached soon.

A concrete configuration of the end approach presentation controller 590 is similar to the configuration of the end controller 580 illustrated in FIG. 5, and therefore the reference signs of the end controller 580 are partially used as those of the end approach presentation controller 590 so that the description of the end controller 580 is incorporated by reference to the description of the end approach presentation controller 590. Specifically, the difference between: the limit angle adjustment value (±θ_lim) based on the limit angle absolute value map 581; and the angle θr, θt of the reaction force device or the turning device is input to calculators 595N and 595P.

Basic calculation configurations of the calculators 595N and 595P are similar to those of the calculators 585N and 585P of the end controller 580. In this regard, however, the reference signs of the proportional term coefficient and the differential term coefficient used in the second embodiment are the symbols "K2" and "D2" different from those in the first embodiment. Specifically, a difference in characteristic between the end presentation and the end approach presentation is adjusted by the values of the proportional term coefficient and the differential term coefficient. In addition, the symbol of the presentation command value that is output is denoted by "end approach presentation command value TendA" in contrast to "end presentation command value Tend". End approach presentation command value maps 596N and 596P are different from the end presentation command value maps 586N and 586P only in name, and the map examples of FIGS. 8A and 8B are also used as the end approach presentation command value maps 596N and 596P.

(Operational Effect of the Specific Embodiments)

(1) The end controller 580 of the specific embodiments stops the control of the steering wheel torque controller 620 when: the absolute value |θr|, |θt| of the angle of the reaction force device or the turning device is equal to or greater than the limit angle value θ_lim; and the turning torque corresponding quantity and the detection value T_sns of the sensor 94 are values corresponding to the direction toward the end. The end controller 580 releases the stop of the control when the turning torque corresponding quantity or the detection value T_sns of the torque sensor 94 is a value corresponding to the direction away from the end.

In this manner, in the specific embodiments, the switchover to the execution and/or the stop of the control of the steering wheel torque controller 620 is performed by the end control, in the control configuration where the feedback control is performed so that the detection value T_sns of the torque sensor 94 follows the target value T**st. By stopping the feedback control, the specific embodiments prevents, when the torque of the reaction force device is increased, the torque for the steering angle end presentation from being canceled out due to the feedback control. Therefore, it is possible to present a natural steering angle end to the driver.

(2) The end presentation command value Tend is calculated on the basis of the value obtained by adding a first value and a second value, wherein the first value is the value obtained by multiplying the difference between the limit angle adjustment value (±θ_lim) and the angle θr, θt of the reaction force device or the turning device by the proportional term coefficient K1, and the second value is the value obtained by multiplying the rotational angular velocity ωr, ωt of the reaction force device or the turning device by the differential term coefficient D1. Not only the proportional term which is based on the position in a static sense but also the differential term which reflects a dynamic position change are included for the end presentation command value Tend, so that a more natural steering angle end is presented to the driver.

(3) The limit angle value θ_lim is set to a value smaller than the mechanical limit angle θ_lim_mech of the turning device, specifically set to a position closer to the neutral position than the mechanical limit angle θ_lim_mec by a degree of anticipated overshoot of the control. Accordingly, it is possible to protect parts such as gears of the turning device 80 from damage or wear due to collisions.

(4) The limit angle value θ_lim is variably set according to the vehicle speed V. Accordingly, it is possible to present a natural steering angle end according to the vehicle speed V.

(5) When the control of the steering wheel torque controller 620 is stopped, the end controller 580 stops the integral calculator 626 from performing the integral calculation, wherein the integral calculator 626 is at the last stage as illustrated in FIG. 9. Since the feedback control calculation by each of the controllers 624P, 624I, 624D is continued even when the integral calculation is stopped, continuity when the stop of the control stop is released is secured.

(6) In the second embodiment, the end approach presentation command value TendA calculated according to the angle θr, θt of the reaction force device or the turning device by the end approach presentation controller 590 is added to the steering torque command value T*st. Accordingly, it is possible to present the approach to the limit angle value θ_lim to the driver before the limit angle value θ_lim is reached in a direction from the neutral position.

<Comparison with JP 2006-62625A>

JP 2006-62625A, paragraphs [0048] to [0050], FIG. 2, FIG. 5 etc., describes a vehicular steering control device of a steer-by-wire system and discloses that "when a steering angle reaches a lock angle being a steering angle that corresponds to a limit steered angle of a steered wheel, a control unit for steering control performs an angle servo control of controlling a steering reaction force so that the steering angle matches a predetermined steering angle that is near and is not beyond the lock angle", and that "the control unit for steering control continues the angle servo control until a difference between the steering angle and the predetermined steering angle becomes a predetermined value or less". There is at least the following difference between the specific embodiments and JP 2006-62625A.

In the control of JP 2006-62625A, when the steering angle exceeds the predetermined steering angle (specifically, the end position) due to a temporary large torque input, the reaction force torque is increased by the angle servo control to provide turn back to the predetermined steering angle. Because of the forcible turn back to the predetermined steering angle, the driver may feel uncomfortable. By contrast, in the present embodiment, the steering wheel torque controller 620 performs torque feedback control of the reaction torque, and stops the integral in the torque feedback control in response to the steering angle reaching the end. Therefore, when a large temporary torque is input, the driver can perform a steer operation by an amount corresponding to the torque and it is possible to present a feeling of hitting a hard object.

OTHER EMBODIMENTS (a) In the steer-by-wire system 90, the reaction force device 70 or the turning device 80 may not include the reaction-force-use reducer 79 or the turning-use reducer 89 illustrated in FIG. 1.

(b) The steering control device 200 is not limited to such a machine-electric integrated configuration as illustrated in FIG. 1. The controller 270, 280 and the power converter 77, 87 may be arranged separately from the rotary electric machine 78, 88. In such cases, the two controllers 270 and 280 may not be physically separated and may be a single body steering control device 200. Alternatively, one of the reaction force device 70 and the turning device 80 may be configured as a machine-electric integrated type including a managerial controller, and may transmit and receive signals to and from another device.

(c) A physical quantity corresponding to X used to calculate a respective quantity in the specific embodiments may include, in addition to the physical quantity X illustrated, various physical quantities that are uniquely convertible into X by multiplication and/or division of coefficients and/or differentiation and/or integral. For example, the physical quantity corresponding to "the rotational angular velocity $\omega r$ (deg/s) of the reaction force device" includes a rotational speed (rpm) of the reaction-force-use rotary electric machine 78, rotational speeds of various parts connected to the output shaft of the reaction-force-use rotary electric machine 78 via the reducer 79 etc., and the like.

(d) In the configuration of the end controller 580 of the above-described embodiment, the end presentation command value Tend_P is calculated on the basis of the difference between the positive limit angle value $\theta\_lim$ and the angle $\theta r, \theta t$ of the reaction force device or the turning device and the end presentation command value Tend_N is calculated on the basis of the difference between the negative limit angle value $(-\theta\_lim)$ and the angle $\theta r, \theta t$ of the reaction force device or the turning device, and thereafter, the value obtained by the negative value guarding only and the value obtained by the negative value guarding only are combined. However, the present disclosure is not limited to this configuration example. For example, the sign of the limit angle value $\theta\_lim$ may be adjusted according to the direction of the steering angle with respect to the neutral position, that is, the sign of the angle $\theta r, \theta t$ of the reaction force device or the turning device, and the end presentation command value Tend in a region including the positive and negative values is finally obtained.

The present disclosure is not limited to the embodiments described above, and various other embodiments may be implemented within the spirit and scope of the present disclosure.

The controllers, control devices, and methods described in the present disclosure may be implemented by a special purpose computer created by configuring a memory and a processor programmed to execute one or more particular functions embodied in computer programs. Alternatively, the controllers, control devices, and methods described in the present disclosure may be implemented by a special purpose computer created by configuring a processor provided by one or more special purpose hardware logic circuits. Alternatively, the controllers, control devices, and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A steering control device in a steer-by-wire system, the steer-by-wire system including:
a reaction force device that is connected to a steering wheel and includes a reaction-force-use rotary electric machine and a reaction-force-use power converter for driving the reaction-force-use rotary electric machine;
a turning device that turns tire wheels and includes a turning-use rotary electric machine and a turning-use power converter for driving the turning-use rotary electric machine; and
a torque sensor that detects an steering input of a driver the steering control device being configured to control the reaction force device and the turning device,
the steering control device comprising:
a reaction force controller that calculates a steering torque command value on a basis of a physical quantity corresponding to an output torque of the turning device;
a steering wheel torque controller that calculates a basic reaction force torque command value being a basic value of a reaction force torque command value so that a detection value of the torque sensor follows a target value that is based on the steering torque command value;
an end controller that, when an absolute value of angle of the reaction force device or the turning device is equal to or greater than a predetermined limit angle value, calculates an end presentation command value of the reaction force device to cause the driver to be unable to rotate the steering wheel to the limit angle value or more; and
a reaction force device current controller that controls an electric current flowing to the reaction-force-use rotary electric machine, on a basis of the basic reaction force torque command value and the end presentation command value,
wherein:
the end controller stops a control of the steering wheel torque controller when: the absolute value of the angle of the reaction force device or the turning device is equal to or greater than the limit angle value; and the physical quantity corresponding to the output torque of the turning device and the detection value of the torque sensor are values corresponding to a direction toward the limit angle value.

2. The steering control device according to claim 1, wherein
the limit angle value having a sign that has been adjusted according to a direction of a steering angle with respect to a neutral position is a limit angle adjustment value,
the end presentation command value is calculated on a basis of a value obtained by adding:
a value obtained by multiplying a difference between the limit angle adjustment value and the angle of the reaction force device or the turning device by a proportional term coefficient; and a value obtained by multiplying a rotational angular velocity of the reaction force device or the turning device by a differential term coefficient.

3. The steering control device according to claim 1, wherein
the limit angle value is set to a value smaller than a mechanical limit angle of the turning device.

4. The steering control device according to claim 1, wherein
the limit angle value is variably set according to vehicle speed.

5. The steering control device according to claim 1, wherein:
the steering wheel torque controller includes, at a last stage, an integral calculator; and
when stopping the control of the steering wheel torque controller, the end controller stops integral calculation of the integral calculator.

6. The steering control device according to claim 1, wherein
an end approach presentation command is added to the steering torque command value, wherein the end approach presentation command value is calculated according to the angle of the reaction force device or the turning device to present approach to the limit angle value to the driver before the limit angle value is reached in a direction from a neutral position.

7. A steering control device in a steer-by-wire system, the steer-by-wire system including:
a reaction force device that is connected to a steering wheel and includes a reaction-force-use rotary electric machine and a reaction-force-use power converter for driving the reaction-force-use rotary electric machine;
a turning device that turns tire wheels and includes a turning-use rotary electric machine and a turning-use power converter for driving the turning-use rotary electric machine; and
a torque sensor that detects an steering input of a driver
the steering control device being configured to control the reaction force device and the turning device,
the steering control device comprising a processor and a memory, the memory storing a program configured to, when executed by the processor, cause the processor to:
calculate a steering torque command value on a basis of a physical quantity corresponding to an output torque of the turning device;
perform a specific control to calculate a basic reaction force torque command value being a basic value of a reaction force torque command value so that a detection value of the torque sensor follows a target value that is based on the steering torque command value;
when an absolute value of angle of the reaction force device or the turning device is equal to or greater than a predetermined limit angle value, calculate an end presentation command value of the reaction force device to cause the driver to be unable to rotate the steering wheel to the limit angle value or more;
control an electric current flowing to the reaction-force-use rotary electric machine, on a basis of the basic reaction force torque command value and the end presentation command value; and
stop the specific control when: the absolute value of the angle of the reaction force device or the turning device is equal to or greater than the limit angle value; and the physical quantity corresponding to the output torque of the turning device and the detection value of the torque sensor are values corresponding to a direction toward the limit angle value.

* * * * *